No. 672,829. Patented Apr. 23, 1901.
J. S. GOODWIN.
LIGHTING AND HEATING APPARATUS.
(Application filed May 22, 1899.)
(No Model.)

Witnesses
Inventor
J. S. Goodwin

THE NORRIS PETERS CO., PHOTO-LITHO., WASHINGTON, D. C.

UNITED STATES PATENT OFFICE.

JOSEPH SOMERS GOODWIN, OF LONDON, ENGLAND.

LIGHTING AND HEATING APPARATUS.

SPECIFICATION forming part of Letters Patent No. 672,829, dated April 23, 1901.

Application filed May 22, 1899. Serial No. 717,347. (No model.)

*To all whom it may concern:*

Be it known that I, JOSEPH SOMERS GOODWIN, a British subject, residing at No. 4ª Bethune road, Stamford Hill, London, England, have invented a new and useful Lighting and Heating Apparatus, (for which I have applied for a patent in Great Britain, No. 394, bearing date the 7th day of January, 1899,) of which the following is a specification.

My invention relates to a new and improved apparatus capable of being used either for lighting or for heating purposes and designed to burn mineral and other oils and generally any combustible liquid capable of ascending along the meshes of a suitable wick. When used for lighting purposes, this apparatus has for one object to produce and draw unconsumed vapors disengaged from a burning wick situated at the lower end of the same above the oil-receptacle up a central gas-tube in order to be ignited and burned on issuing from a burner having preferably a circular form—such as an Argand burner, for instance—and fixed to the upper and reduced end of the said gas-tube, thus producing a brilliant flame.

A further object of my invention is to produce an atmospheric flame capable of giving a dazzling light within a mantle, which is thereby raised to incandescence (such as generally used) by admitting air within a central air-tube extending slightly below the bottom of the oil-reservoir at its lower end and inserted at its upper end within the gas-tube aforesaid, to which it is connected by a suitable joint, preferably by a bayonet-joint, the air and vapors meeting at the outlet of this air-tube and mixing together in the gas-tube and in a mixing-chamber formed higher up in the latter tube, so as to emerge as a homogeneous gaseous mixture out of the burner fitted to the upper end of the gas-tube, which burner is provided at the top with a wire-gauze cap and is inclosed in a mantle of ordinary construction.

My apparatus can be used for the production of either an ordinary or an atmospheric flame, according as the air-tube is closed and a circular or other burner is fixed to the top of the gas-tube in the first case or the said air-tube is opened and a wire-gauze cap and mantle are fixed to the top of the gas-tube in lieu of the burner aforesaid.

Figure 1:
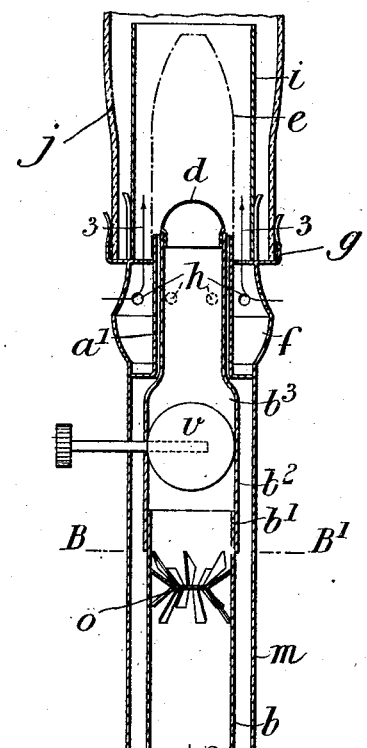
Figure 2:
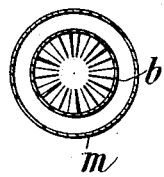
Figure 3:
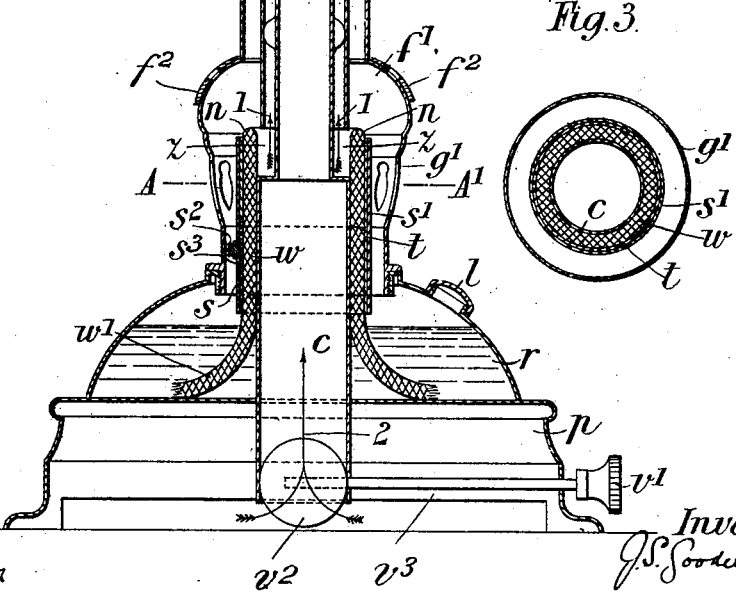

In the accompanying drawings, which illustrate my improved apparatus when used for lighting purposes or as a lamp, Figure 1 is a central vertical section of the same. Figs. 2 and 3 are cross-sections on lines B B' and A A', respectively.

This apparatus when used for lighting purposes—that is to say, for producing a light with an atmospheric flame inclosed in a mantle—consists of a pedestal $p$, surmounted by an oil-reservoir $r$, carrying the perforated gallery $g'$ and solid fitting $f'$, the latter of which terminates the outer vertical casing $m$, provided at the top with the fitting $f$ and the gallery $g$. Through the center of the pedestal and the oil-reservoir passes a central air pipe or intake $c$, the lower end of which extends slightly below the bottom of the said pedestal and is open, while the upper end of this air-pipe is reduced at $z$ and likewise open at the top. The lower end of this intake $c$ is provided with a butterfly-valve $v^2$, having a suitable stem $v^3$ and thumb-piece $v'$, and is adapted to regulate the air-supply to said intake $c$. This reduced end is located within a vertical gas-pipe $b$, the lower end of which is in contact with the flame, while its upper end is provided with a mixing device $o$ and is inserted in the continuation $b'$ of the said gas-pipe $b$, telescoped into the burner-pipe $b^2$. The latter has a reduced end $b^3$ and is open at the top, being surrounded by a tube $a'$, the lower end of which is fixed to the casing $m$. A cap of wire-gauze $d$ is inserted in the upper end $b^3$ of the pipe $b^2$.

$e$ is a mantle surrounding the cap or top end of the gas-tube as well as the tube $a'$. A talc tube $i$ is provided to surround the mantle, a portion of the tube $a$, and rest on the gallery $g$, the object of this talc tube being to protect the mantle when the glass chimney is removed. A glass above referred to or other chimney, likewise bearing on such gallery, incloses the whole.

$h$ represents air-holes for admitting air to the upper burner.

$v$ is a butterfly-valve controlling the supply of the gaseous mixture for the upper burner.

The mixing-chamber $o$ consists of a tube $u$, provided at the top and at the bottom with a shallow dished cap $a$, furnished with a number of radial vanes $q$, Fig. 2. The gas-pipe $b$ and the air-pipe $c$ are jointed together in any suitable manner, such as by a bayonet-joint. (Not shown.) A wick $w$, having two loose lateral extension, $w'$ at its lower ends is inserted between the wick-tube $t$ and the air-tube $c$, a slotted guide-tube $s'$ being screwed in the reservoir surrounding the said wick-tube. The latter is provided with a rack $s$, actuated by a toothed wheel $s^3$, mounted on an axis $s^2$, which is furnished at one end with a suitable milled-edge knob. (Not shown.) The oil-reservoir is furnished with an opening closed by a cap $l$ and through which oil is fed into the same. The lamp being thus filled with oil, the casing $m$ is raised so that the fitting $f'$ should be at a suitable height to allow for the insertion of a match to ignite the wick at $n$, when the said casing is dropped down again. A blue flame being produced around the upper circular edge of the wick $w$, Figs. 1 and 3, the unconsumed oil, gases, or vapors, mainly generated in the recess $z$, formed for this purpose, ascend in the direction indicated by the two lateral arrows 1 up the gas-pipe $b$ and meet at the top of the air-tube with the air drawn in the direction indicated by the central arrows 2, the air and gas being thoroughly mixed by the mixing device $o$, after which the gaseous mixture ascends to the cap $d$, where it is ignited through the mantle, air being drawn in through the holes $h$ and in the direction indicated by the two side arrows 3. The light produced in the mantle is of a dazzling brilliancy and of great lighting power.

In order to facilitate the lighting or starting of the lamp at the lowermost burner, a circular row of air-holes may be formed near the top of the solid fitting $f$ and be closed subsequently by a solid sliding ring $f^2$. Through the gallery $g'$ there is an abundant air-supply to the wick. When the air-controlling butterfly-valve $v$ is closed and the mantle $e$ and the cap $d$ are removed, while a circular or other burner is fixed to the top of the gas-pipe $b$, an ordinary light of great power is produced.

What I claim, and desire to secure by Letters Patent, is—

1. In a lighting and heating device, the combination with the reservoir and lower burner having a wick, of a gas-generating chamber adjacent to said wick, a conveying-tube leading from said generating-chamber, an air-inlet tube communicating with said conveying-tube, a mixing device within said conveying-tube, an upper burner at the head of said conveying-tube, and a casing surrounding said lower burner and forming a chimney therefor, substantially as described.

2. In a lighting and heating device, the combination with the reservoir and lower burner having a wick, of a gas-generating chamber adjacent to said wick, a conveying-tube leading from said generating-chamber, an air-inlet tube communicating with said conveying-tube, means for controlling the air-supply thereto, a mixing device within said conveying-tube, an upper burner at the head of said conveying-tube, and a casing surrounding said lower burner and forming a chimney therefor, substantially as described.

3. In a lighting and heating device, the combination with the reservoir and lower burner having a wick, of a gas-generating chamber adjacent to said wick, a conveying-tube leading from said generating-chamber, an air-inlet tube communicating with said conveying-tube, means for controlling the air-supply thereto, a mixing device within said conveying-tube, an upper burner at the head of said conveying-tube, means for governing the supply of air and gas to said upper burner and a casing surrounding said lower burner, forming a chimney therefor and opening at the top adjacent to said upper burner, substantially as described.

JOSEPH SOMERS GOODWIN.

Witnesses:
JOHN PALMER WILLIS GOODWIN,
GUSTAVE ADOLPHE DE KATON.